(12) United States Patent
Fang

(10) Patent No.: US 10,147,178 B2
(45) Date of Patent: Dec. 4, 2018

(54) METHOD OF RECOGNIZING WAFER

(71) Applicant: NANYA TECHNOLOGY CORPORATION, Taoyuan (TW)

(72) Inventor: Wei-Li Fang, New Taipei (TW)

(73) Assignee: NANYA TECHNOLOGY CORPORATION, Taoyuan (TW)

( * ) Notice: Subject to any disclaimer, the term of this patent is extended or adjusted under 35 U.S.C. 154(b) by 36 days.

(21) Appl. No.: 15/404,627

(22) Filed: Jan. 12, 2017

(65) Prior Publication Data
US 2018/0197284 A1 Jul. 12, 2018

(51) Int. Cl.
G06T 7/00 (2017.01)
G06K 9/62 (2006.01)

(52) U.S. Cl.
CPC ............ *G06T 7/001* (2013.01); *G06K 9/6247* (2013.01); *G06K 9/6276* (2013.01); *G06T 2207/30148* (2013.01)

(58) Field of Classification Search
CPC .......... G06T 7/001; G06T 2207/30148; G06K 9/6214; G06K 9/6276
See application file for complete search history.

(56) References Cited

U.S. PATENT DOCUMENTS 5,544,256 A * 8/1996 Brecher ................ G06T 7/0006
382/149
5,568,563 A * 10/1996 Tanaka ..................... G06T 7/001
257/E21.53
2013/0202188 A1 * 8/2013 Urano .................. G06K 9/6202
382/149
2015/0103348 A1 4/2015 Zhao

FOREIGN PATENT DOCUMENTS

| TW | 201415010 A | * | 4/2014 |
| TW | 201415010 A | | 4/2014 |
| TW | 201526135 A | | 7/2015 |

OTHER PUBLICATIONS

Office Action dated Dec. 25, 2017 in corresponding TW Application No. 106111380 with partial English translation, pp. 1-6.

* cited by examiner

*Primary Examiner* — Ping Y Hsieh
(74) *Attorney, Agent, or Firm* — Muncy, Geissler, Olds & Lowe, P.C.

(57) ABSTRACT

A method includes obtaining image information including a first vector by capturing an image of a first wafer, wherein the first wafer is known to be a good product; obtaining image information including a second vector by capturing an image of a second wafer, wherein the second wafer is known to be a defective product; calculating a projection vector based on a covariance matrix associated with the first vector and the second vector; obtaining image information including a third vector by capturing an image of a third wafer under a test; projecting each of the first vector, the second vector and the third vector onto the projection vector; and classifying the third wafer as either the good product or the defective product based on the projected first vector, the projected second vector and the projected third vector.

19 Claims, 8 Drawing Sheets

METHOD OF RECOGNIZING WAFER

TECHNICAL FIELD

The present disclosure relates to a method of recognizing a wafer, and more particularly, to a method of recognizing a wafer under a test.

DISCUSSION OF THE BACKGROUND

Wafers are generally used as a foundation for building semiconductor devices. During the process of manufacturing the semiconductor devices, the wafers might be damaged. For example, foreign particle contamination or other pollution, area defects, or the adverse sheath may occur on the wafers.

This Discussion of the Background section is provided for background information only. The statements in this Discussion of the Background are not an admission that the subject matter disclosed in this section constitutes prior art to the present disclosure, and no part of this section may be used as an admission that any part of this application, including this Discussion of the Background section, constitutes prior art to the present disclosure.

SUMMARY

One aspect of the present disclosure provides a method. The method includes obtaining image information including a first vector by capturing an image of a first wafer, wherein the first wafer is known to be a good product; obtaining image information including a second vector by capturing an image of a second wafer, wherein the second wafer is known to be a defective product; calculating a projection vector based on a covariance matrix associated with the first vector and the second vector; obtaining image information including a third vector by capturing an image of a third wafer under a test; projecting each of the first vector, the second vector and the third vector onto the projection vector; and classifying the third wafer as either the good product or the defective product based on the projected first vector, the projected second vector and the projected third vector.

In some embodiments, the calculation of the projection vector based on the covariance matrix associated with the first vector and the second vector further comprises calculating the covariance matrix based on the first vector and the second vector.

In some embodiments, the calculation of the projection vector based on the covariance matrix associated with the first vector and the second vector further comprises calculating a first eigenvalue and a second eigenvalue based on the covariance matrix.

In some embodiments, the calculation of the projection vector based on the covariance matrix associated with the first vector and the second vector further comprises calculating a first eigenvector and a second eigenvector based on both the first eigenvalue and the second eigenvalue.

In some embodiments, the calculation of the projection vector based on the covariance matrix associated with the first vector and the second vector further comprises calculating the projection vector based on both the first eigenvector and the second eigenvector.

In some embodiments, the classifying the third wafer as either the good product or the defective product based on the projected first vector, the projected second vector and the projected third vector comprises classifying the third wafer as either the good product or the defective product based on the projected first vector, the projected second vector and the projected third vector and according to a nearest neighbor rule (NNR).

In some embodiments, the classifying the third wafer as either the good product or the defective product based on the projected first vector, the projected second vector and the projected third vector comprises calculating a first distance between the projected first vector and the projected third vector; calculating a second distance between the projected first vector and the projected third vector; and classifying the third wafer as either the good product or the defective product based on the first distance and the second distance.

In some embodiments, the classifying the third wafer as either the good product or the defective product based on the first distance and the second distance comprises classifying the third wafer as the good product when the first difference is less than the second difference.

In some embodiments, the classifying the third wafer as either the good product or the defective product based on the first distance and the second distance comprises classifying the third wafer as the defective product when the first difference is greater than the second difference.

Another aspect of the present disclosure provides a method. The method includes obtaining image information including a first vector by capturing an image of a first wafer, wherein the first wafer is known to be a good product; obtaining image information including a second vector by capturing an image of a second wafer, wherein the second wafer is known to be a defective product; calculating a covariance matrix based on the first vector and the second vector; calculating a first eigenvalue and a second eigenvalue based on the covariance matrix; comparing the first eigenvalue and the second eigenvalue; calculating an eigenvector based on the first eigenvalue, instead of both the first eigenvalue and the second eigenvalue when the first eigenvalue is greater than the second eigenvalue; obtaining a projection vector based on the eigenvector; projecting each of the first vector, the second vector and the third vector onto the projection vector; and classifying the third wafer as either the good product or the defective product based on the projected first vector, the projected second vector and the projected third vector.

In some embodiments, the classifying the third wafer as either the good product or the defective product based on the projected first vector, the projected second vector and the projected third vector comprises classifying the third wafer as either the good product or the defective product based on the projected first vector, the projected second vector and the projected third vector and according to the nearest neighbor rule (NNR).

In some embodiments, the classifying the third wafer as either the good product or the defective product based on the projected first vector, the projected second vector and the projected third vector comprises calculating a first distance between the projected first vector and the projected third vector; calculating a second distance between the projected first vector and the projected third vector; and classifying the third wafer as either the good product or the defective product based on the first distance and the second distance.

In some embodiments, the classifying the third wafer as either the good product or the defective product based on the first distance and the second distance comprises classifying the third wafer as the good product when the first difference is less than the second difference.

In some embodiments, the classifying the third wafer as either the good product or the defective product based on the first distance and the second distance comprises classifying the third wafer as the defective product when the first difference is greater than the second difference.

Another aspect of the present disclosure provides an apparatus. The apparatus includes an image capturing device and a processing device. The image capturing device is configured to capture an image of a first wafer, an image of a second wafer and an image of a third wafer, wherein the first wafer is known to be a good product, the second wafer is known to be a defective product, and the third wafer is under a test. The processing device is configured to obtain image information including a first vector based on the image of the first wafer, obtain image information including a second vector based on the image of the second wafer, obtain image information including a third vector based on the image of the third wafer, calculate a projection vector based on a covariance matrix associated with the first vector and the second vector, project each of the first vector, the second vector and the third vector onto the projection vector, and classify the third wafer as either the good product or the defective product based on the projected first vector, the projected second vector and the projected third vector.

In some embodiments, the processing device is further configured to calculate the covariance matrix based on the first vector and the second vector.

In some embodiments, the processing device is further configured to calculate a first eigenvalue and a second eigenvalue based on the covariance matrix.

In some embodiments, the processing device is further configured to calculate a first eigenvector and a second eigenvector based on both the first eigenvalue and the second eigenvalue.

In some embodiments, the processing device is further configured to calculate the projection vector based on both the first eigenvector and the second eigenvector.

In the present disclosure, the processing device recognizes the wafer under a test using a specific algorithm mentioned above to analyze the captured image. Therefore, a recognition rate of defective wafers is relatively high.

In contrast, in some existing wafer-identification apparatuses, such apparatus recognizes wafers based on optical approaches. For example, a light source is provided. A light source radiates light on a wafer under a test. Subsequently, the existing apparatus determines whether the wafer has a defect based on the light reflected from the wafer. Such approach is relatively inaccurate. Moreover, in some existing approaches, a wafer under a test is identified manually.

The foregoing has outlined rather broadly the features and technical advantages of the present disclosure in order that the detailed description of the disclosure that follows may be better understood. Additional features and advantages of the disclosure are described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

Figure 1:
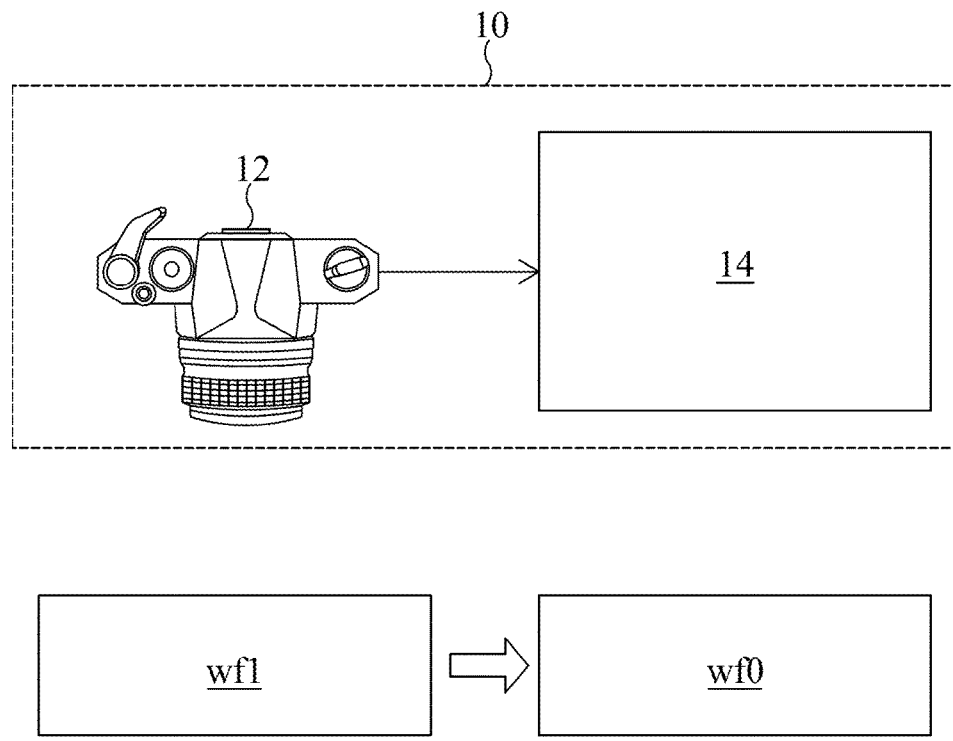
FIG. 1 is a diagram illustrating an apparatus recognizing wafers in accordance with some embodiments of the present disclosure.

Embodiments, or examples, of the disclosure illustrated in the drawings are now described using specific language. It shall be understood that no limitation of the scope of the disclosure is thereby intended. Any alteration or modification to the described embodiments, and any further applications of principles described in this document, are to be considered as normally occurring to one of ordinary skill in the art to which the disclosure relates. Reference numerals may be repeated throughout the embodiments, but this does not necessarily require that feature(s) of one embodiment apply to another embodiment, even if they share the same reference numeral.

It shall be understood that when an element is referred to as being "connected to" or "coupled with" another element, it may be directly connected to or coupled to the other element, or intervening elements may be present.

It shall be understood that, although the terms first, second, third, etc. may be used herein to describe various elements, components, regions, layers or sections, these elements, components, regions, layers or sections should not be limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It shall be further understood that the terms "comprises" and "comprising," when used in this specification, specify the presence of stated features, integers, steps, operations, elements, or components, but do not preclude the presence or addition of one or more other features, integers, steps, operations, elements, components, or groups thereof.

FIG. 1 is a diagram illustrating an apparatus 10 recognizing wafers wf1 and wf2 in accordance with some embodiments of the present disclosure. Referring to FIG. 1, the apparatus 10 includes an image-capturing device 12 and a processing device 14. The image-capturing-device 12 functions to capture an image of wafers. In an embodiment, the image-capturing device includes a camera. The processing device 14 functions to recognize a wafer under a test, which will be described in detail below.

In the present disclosure, the processing device 14 recognizes the wafer under a test using a specific algorithm to analyze the captured image. Therefore, a recognition rate of defective wafers is relatively high.

In contrast, in some existing wafer-identifying apparatuses, such apparatus recognizes wafers based on optical approaches. For example, a light source is provided. A light source radiates light on a wafer under a test. Subsequently, the existing apparatus determines whether the wafer has a defect based on the light reflected from the wafer. Such approach is relatively inaccurate. Moreover, in some existing approaches, a wafer under a test is identified manually.

Figure 2:
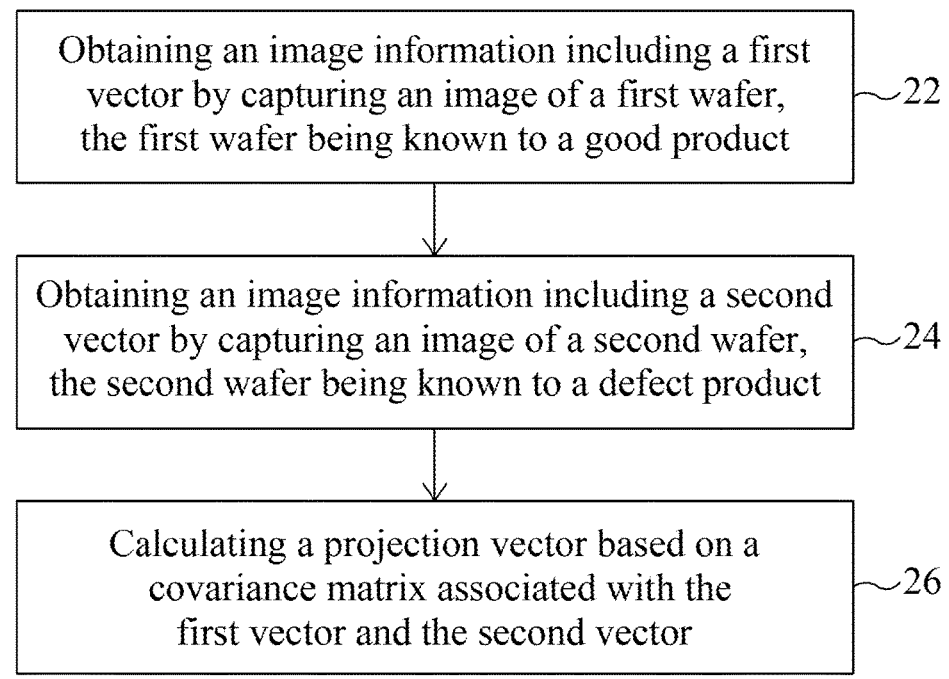
FIG. 2 is a flow chart illustrating a first operation of a method of recognizing wafers in accordance with some embodiments of the present disclosure.

FIG. 2 is a flow chart illustrating a first operation 20 of a method of recognizing wafers in accordance with some embodiments of the present disclosure. Referring to FIG. 2, the first operation 20 is a preparation stage of the method. In order to determine whether a wafer under a test should be classified as a good product or a defective product, in the preparation stage, a first wafer known to be a good product and a second wafer known to be a defective product has been prepared.

In operation 22, image information including a first vector V1 is obtained by capturing an image of a first wafer. For example, the first vector V1 can be expressed as below.

$$V1 = \begin{bmatrix} 1 & 1 \\ 2 & 2 \end{bmatrix}$$

In the present disclosure, the first vector V1 is expressed as a 2×2 matrix. However, the present disclosure is not limited thereto. The first vector V1 can be expressed in any suitable form. Moreover, the number in the matrix only serves as an example. The present disclosure is not limited thereto.

In operation 24, image information including a second vector V2 is obtained by capturing an image of a second wafer. For example, the second vector V2 can be expressed as below.

$$V2 = \begin{bmatrix} -1 & -1 \\ -2 & -2 \end{bmatrix}$$

In the present disclosure, the second vector V2 is expressed as a 2×2 matrix. However, the present disclosure is not limited thereto. The second vector V2 can be expressed in any suitable form. Moreover, the number in the matrix only serves as an example. The present disclosure is not limited thereto.

In operation 26, a projection vector is calculated based on a covariance matrix associated with the first vector and the second vector, which will be described and illustrated with reference to FIG. 4.

The first operation 20 is merely an example, and is not intended to limit the present disclosure beyond what is explicitly recited in the claims Additional operations can be provided before, during, and after the first operation 20, and some operations described can be replaced, eliminated, or moved around for additional embodiments of the method.

Figure 3:
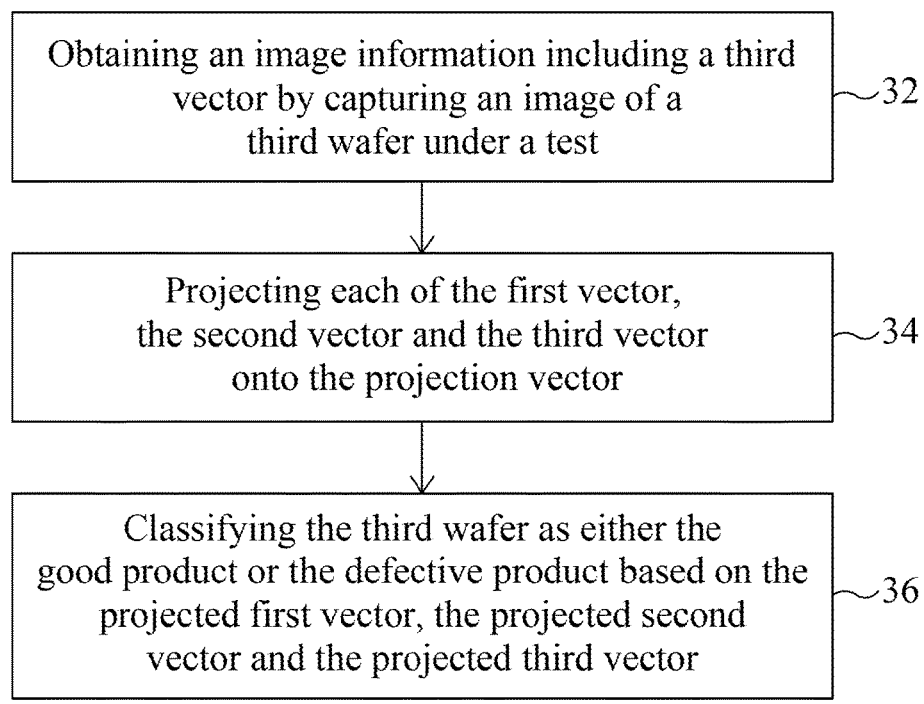
FIG. 3 is a flow chart illustrating a second operation subsequent to the first operation of the method of recognizing wafers in accordance with some embodiments of the present disclosure.

FIG. 3 is a flow chart illustrating a second operation 30 subsequent to the first operation 20 of the method of recognizing wafers in accordance with some embodiments of the present disclosure. Referring to FIG. 3, the second operation 30 is a recognition stage of the method.

In operation 32, image information including a third vector V3 is obtained by capturing an image of a third wafer under a test. For example, the third vector V3 can be expressed as below.

$$V3 = \begin{bmatrix} 1 & 1 \\ 1 & 1 \end{bmatrix}$$

In the present disclosure, the third vector V3 is expressed as a 2×2 matrix. However, the present disclosure is not limited thereto. The third vector V3 can be expressed in any suitable form. Moreover, the number in the matrix only serves as an example. The present disclosure is not limited thereto.

In operation 34, each of the first vector V1, the second vector V2 and the third vector V3 is projected onto the projection vector, which will be described and illustrated in detail with reference to FIG. 5.

In operation 36, the third wafer is classified as either the good product or the defective product based on the projected first vector, the projected second vector and the projected third vector, which will be described and illustrated in detail with reference to FIGS. 5 and 6.

In the present disclosure, the processing device 14 recognizes the wafer under a test using a specific algorithm to analyze the captured image. Therefore, a recognition rate of defective wafers is relatively high.

In contrast, in some existing wafer-identifying apparatuses, such apparatus recognizes wafers based on optical approaches. For example, a light source is provided. A light source radiates light on a wafer under a test. Subsequently, the existing apparatus determines whether the wafer has a defect according to the light reflected from the wafer. Such approach is relatively inaccurate. Moreover, in some existing approaches, a wafer under a test is identified manually.

The second operation 30 is merely an example, and is not intended to limit the present disclosure beyond what is explicitly recited in the claims. Additional operations can be provided before, during, and after the second operation 30, and some operations described can be replaced, eliminated, or moved around for additional embodiments of the method.

Figure 4:
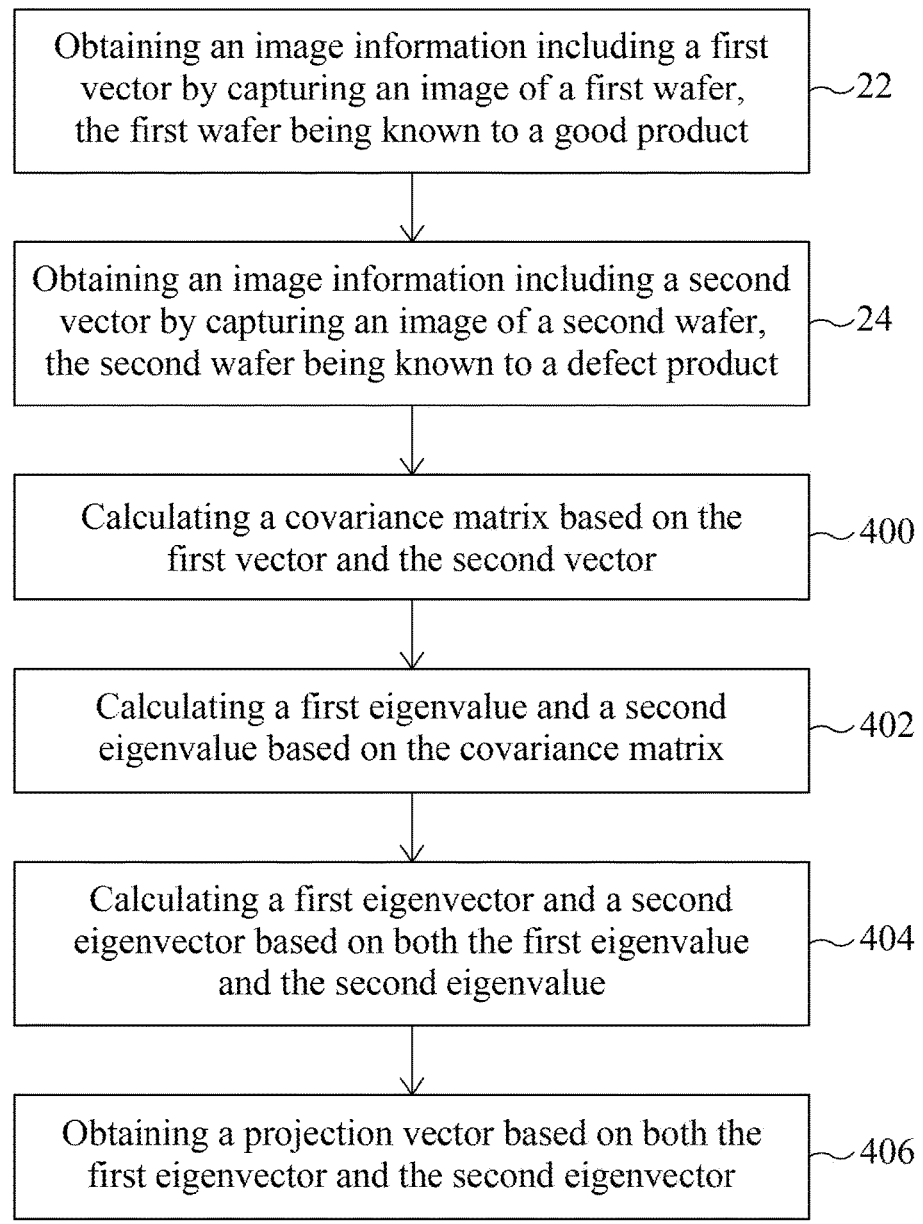
FIG. 4 is a flow chart illustrating another first operation of a method of recognizing wafers in accordance with some embodiments of the present disclosure.

FIG. 4 is a flow chart illustrating another first operation 40 of a method of recognizing wafers in accordance with some embodiments of the present disclosure. Referring to FIG. 4, the first operation 40 is similar to the first operation 20 described and illustrated with reference to FIG. 2 except that, for example, the first operation 40 includes operations 400, 402, 404 and 406.

In operation 400, a covariance matrix is calculated based on the first vector V1 and the second vector V2. For example, the covariance matrix can be calculated as below.

$$\overline{A} = \frac{1}{2}(A1 + A2)$$
$$= \frac{1}{2}\left(\begin{bmatrix} 1 & 1 \\ 2 & 2 \end{bmatrix} + \begin{bmatrix} -1 & -1 \\ -2 & -2 \end{bmatrix}\right)$$
$$= \frac{1}{2}\begin{bmatrix} 0 & 0 \\ 0 & 0 \end{bmatrix}$$
$$= \begin{bmatrix} 0 & 0 \\ 0 & 0 \end{bmatrix}$$

$$R = \frac{1}{2}\left\{\begin{bmatrix} 1 & 1 \\ 2 & 2 \end{bmatrix}\begin{bmatrix} 1 & 2 \\ 1 & 2 \end{bmatrix} + \begin{bmatrix} -1 & -1 \\ -2 & -2 \end{bmatrix}\begin{bmatrix} -1 & -2 \\ -1 & -2 \end{bmatrix}\right\}$$
$$= \frac{1}{2}\left\{\begin{bmatrix} 2 & 4 \\ 4 & 8 \end{bmatrix} + \begin{bmatrix} 2 & 4 \\ 4 & 8 \end{bmatrix}\right\}$$
$$= \begin{bmatrix} 2 & 4 \\ 4 & 8 \end{bmatrix}$$

Where $\overline{A}$ represents an average vector of the first vector V1 and the second vector V2; and R represents the covariance matrix.

In the present embodiment, a wafer under a test is classified as one of two kinds of wafers, a good product and a defect. Therefore, only two vectors, a vector of the good product and a vector of the defect, are required. An average vector is calculated based on such two vectors. In another embodiment, if a wafer under a test is classified among three kinds of wafers, a good product, a wafer with area defects and a wafer with an adverse sheath, then three vectors are required. That is, the image capturing device 12 captures an image of a wafer known to be a good product, captures an image of a wafer known to be a wafer with area defects, and captures an image of a wafer know to be a wafer with an adverse sheath in the preparation stage prior to the recognition stage. Subsequently, an average vector is calculated based on such three vectors. Accordingly, a wafer under a test can be classified as one of the three kinds of wafers.

In operation 402, a first eigenvalue and a second eigenvalue are calculated based on the covariance matrix. In further detail, to find an eigenvalue of the covariance matrix R, the following equations (1) and (2) should be satisfied.

$(R-\lambda1) \times V = 0$ \hfill (1)

$|R - \lambda I| = 0$ \hfill (2)

Where $\lambda$ represents the eigenvalue; I represents a unit matrix; and V represents an eigenvector.

Values of the covariance matrix are introduced into equation (2) as follows.

$$\begin{bmatrix} 2 & 4 \\ 4 & 8 \end{bmatrix} - \lambda\begin{bmatrix} 1 & 0 \\ 0 & 1 \end{bmatrix} = 0$$
$$\begin{bmatrix} 2 & 4 \\ 4 & 8 \end{bmatrix} - \begin{bmatrix} \lambda & 0 \\ 0 & \lambda \end{bmatrix} = 0$$
$$\begin{bmatrix} 2-\lambda & 4 \\ 4 & 8-\lambda \end{bmatrix} = 0$$
$(2-\lambda)(8-\lambda) - 16 = 0$
$\lambda^2 - 10\lambda + 16 - 16 = 0$
$\lambda(\lambda - 10) = 0$
$\lambda1 = 10$
$\lambda2 = 0$ Where $\lambda1$ represents the first eigenvalue; and $\lambda2$ represents the second eigenvalue.

In operation 404, a first eigenvector and a second eigenvector are calculated based on both the first eigenvalue $\lambda1$ and the second eigenvalue $\lambda2$. For example, to find the first eigenvector, a value of 10 is substituted for the first eigenvalue $\lambda1$ in equation (1).

$$\left\{\begin{bmatrix} 2 & 4 \\ 4 & 8 \end{bmatrix} - 10\begin{bmatrix} 1 & 0 \\ 0 & 1 \end{bmatrix}\right\}\begin{bmatrix} m11 \\ m21 \end{bmatrix} = 0$$
$$\begin{bmatrix} -8 & 4 \\ 4 & -2 \end{bmatrix}\begin{bmatrix} m11 \\ m12 \end{bmatrix} = 0$$
$$EV1 = \begin{bmatrix} m11 \\ m12 \end{bmatrix} = \begin{bmatrix} 1 \\ 2 \end{bmatrix}$$

Where EV1 represents the first eigenvector; m11 represents a first value of the first eigenvector; and m12 represents a second value of the first eigenvector.

Similarly, to find the second eigenvector, a value of 0 is substituted for the second eigenvalue $\lambda2$ in equation (1).

$$\left\{\begin{bmatrix} 2 & 4 \\ 4 & 8 \end{bmatrix} - 0\begin{bmatrix} 1 & 0 \\ 0 & 1 \end{bmatrix}\right\}\begin{bmatrix} m21 \\ m22 \end{bmatrix} = 0$$
$$\begin{bmatrix} 2 & 4 \\ 4 & 8 \end{bmatrix}\begin{bmatrix} m21 \\ m22 \end{bmatrix} = 0$$
$$EV2 = \begin{bmatrix} m21 \\ m22 \end{bmatrix} = \begin{bmatrix} -2 \\ 1 \end{bmatrix}$$

Where EV2 represents the second eigenvector; m21 represents a first value of the second eigenvector; and m22 represents a second value of the second eigenvector.

In operation 406, a projection vector is obtained based on both the first eigenvector EV1 and the second eigenvector EV2. For example, the projection vector is obtained by integrating the first eigenvector EV1 and the second eigenvector EV2 as below.

$$PV = \begin{bmatrix} m11 & m21 \\ m12 & m22 \end{bmatrix} = \begin{bmatrix} 1 & -2 \\ 2 & 1 \end{bmatrix}$$

Where PV represents the projection vector.

Figure 5:
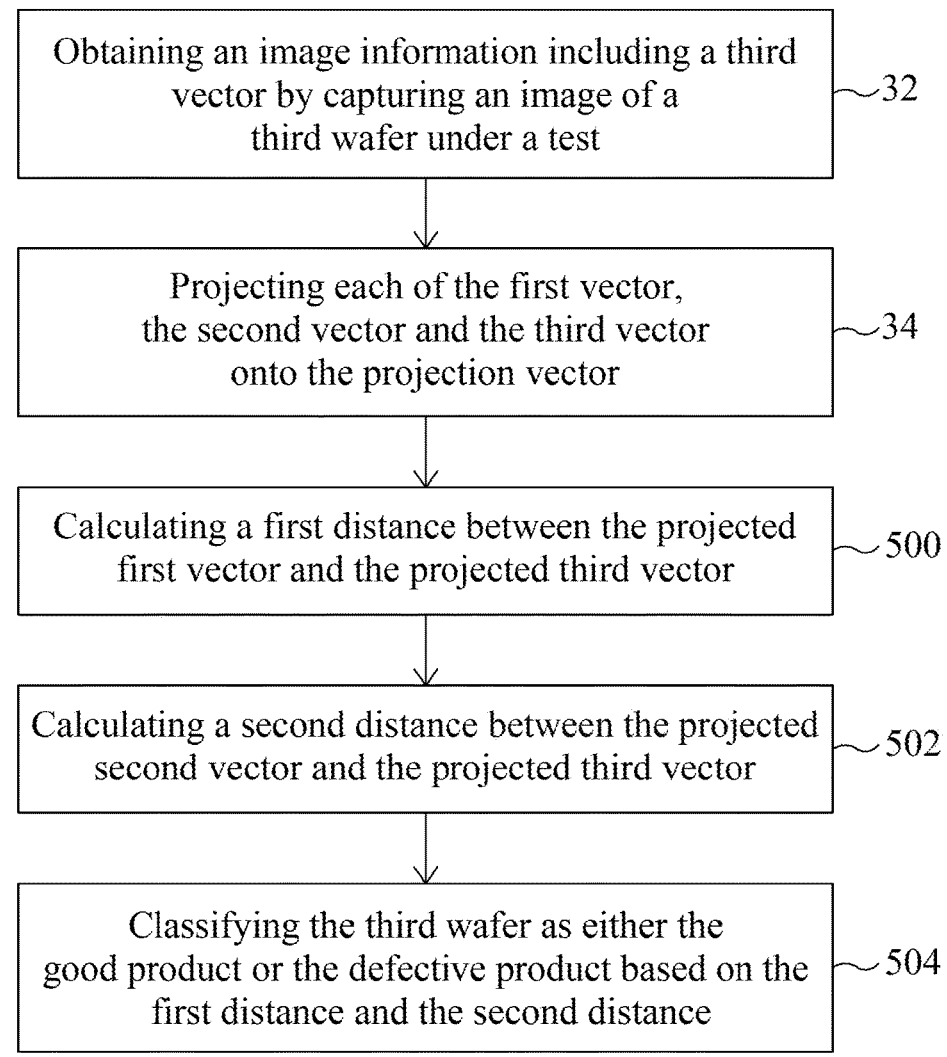
FIG. 5 is a flow chart illustrating another second operation subsequent to the other first operation of the method of recognizing wafers in accordance with some embodiments of the present disclosure.

FIG. 5 is a flow chart illustrating another second operation 50 subsequent to the other first operation 40 of the method of recognizing wafers in accordance with some embodiments of the present disclosure. Referring to FIG. 5, the second operation 50 is similar to the second operation 30 described and illustrated in detail with reference to FIG. 3.

In operation 32, image information including a third vector V3 is obtained by capturing an image of a third wafer under a test. For example, the third vector V3 can be expressed as below.

$$V3 = \begin{bmatrix} 1 & 1 \\ 1 & 1 \end{bmatrix}$$

In the present disclosure, the third vector V3 expressed as a 2×2 matrix. However, the present disclosure is not limited thereto. The third vector V3 can be exhibited in any suitable form. Moreover, the number in the matrix only serves as an example. The present disclosure is not limited thereto.

In operation 34, each of the first vector V1, the second vector V2 and the third vector V3 is projected onto the projection vector PV. For example, a vector projection of the first vector V1 onto the projection vector PV can be expressed as below.

$$VT1 = V1*PV = \begin{bmatrix} 1 & 1 \\ 2 & 2 \end{bmatrix}\begin{bmatrix} 1 & -2 \\ 2 & 1 \end{bmatrix} = \begin{bmatrix} 3 & -1 \\ 6 & -2 \end{bmatrix}$$

Where VT1 represents the projected first vector V1.

A vector projection of the second vector V2 onto the projection vector PV can be expressed as below.

$$VT2 = V2*PV = \begin{bmatrix} -1 & -1 \\ -2 & -2 \end{bmatrix}\begin{bmatrix} 1 & -2 \\ 2 & 1 \end{bmatrix} = \begin{bmatrix} -3 & 1 \\ -6 & 2 \end{bmatrix}$$

Where VT2 represents the projected second vector V2.

A vector projection of the third vector V3 onto the projection vector PV can be expressed as below.

$$VT3 = V3*PV = \begin{bmatrix} 1 & 1 \\ 1 & 1 \end{bmatrix}\begin{bmatrix} 1 & -2 \\ 2 & 1 \end{bmatrix} = \begin{bmatrix} 3 & -1 \\ 3 & -1 \end{bmatrix}$$

Where VT3 represents the projected third vector V3.

In operation 500, a first distance between the projected first vector VT1 and the projected third vector VT3 is calculated. For example, the first distance can be expressed as below.

$$D1 = \sqrt{(3-(3))^2 + (6-(3))^2 + (-1-(-1))^2 + (-2-(-1))^2}$$
$$= \sqrt{10}$$

Where D1 represents the first distance.

In operation 502, a second distance between the projected second vector VT2 and the projected third vector VT3 is calculated. For example, the second distance can be expressed below.

$$D2 = \sqrt{(-3-(3))^2 + (-6-(3))^2 + (1-(-1))^2 + (2-(-1))^2}$$
$$= \sqrt{130}$$

Where D2 represents the second distance.

An approach shown above can be called the nearest neighbor rule (NNR). However, the present disclosure is not limited thereto. The present disclosure can adopt any suitable approach to calculate the first distance D1 and the second distance D2.

In operation 504, the third wafer is classified as either the good product or the defective product based on the first distance and the second distance, as described in detail with reference to FIG. 6. In view of this, operation 504 can be called a classification operation.

In the present disclosure, the processing device 14 recognizes the wafer under a test using a specific algorithm mentioned above to analyze the captured image. Therefore, a recognition rate of defective wafers is relatively high.

In contrast, in some existing wafer-identifying apparatuses, such apparatus recognizes wafers based on optical approaches. For example, a light source is provided. A light source radiates light on a wafer under a test. Subsequently, the existing apparatus determines whether the wafer has a defect based on the light reflected from the wafer. Such approach is relatively inaccurate. Moreover, in some existing approaches, a wafer under a test is identified manually.

Figure 6:
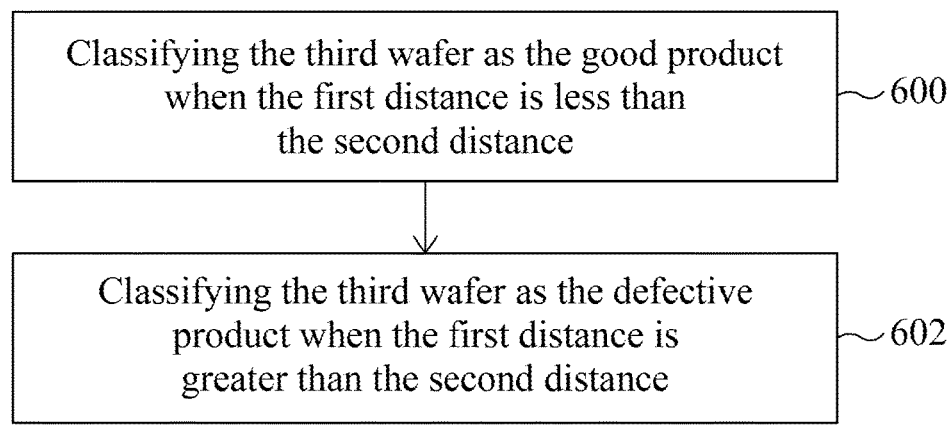
FIG. 6 is a flow chart illustrating the classification operation of FIG. 5 in accordance with some embodiments of the present disclosure.

FIG. 6 is a flow chart illustrating the classification operation of FIG. 5 in accordance with some embodiments of the present disclosure. Referring to FIG. 6, in operation 600, the third wafer is classified as the good product when the first distance D1 is less than the second distance D2. In operation 802, the third wafer is classified as the defective product when the first distance D1 is greater than the second distance D2.

In the present disclosure, the processing device 14 recognizes the wafer under a test using a specific algorithm mentioned above to analyze the captured image. Therefore, a recognition rate of defective wafers is relatively high.

In contrast, in some existing wafer-identifying apparatuses, such apparatus recognizes wafers based on optical approaches. For example, a light source is provided. A light source radiates light on a wafer under a test. Subsequently, the existing apparatus determines whether the wafer has a defect based on the light reflected from the wafer. Such approach is relatively inaccurate. Moreover, in some existing approaches, a wafer under a test is identified manually.

Figure 7:
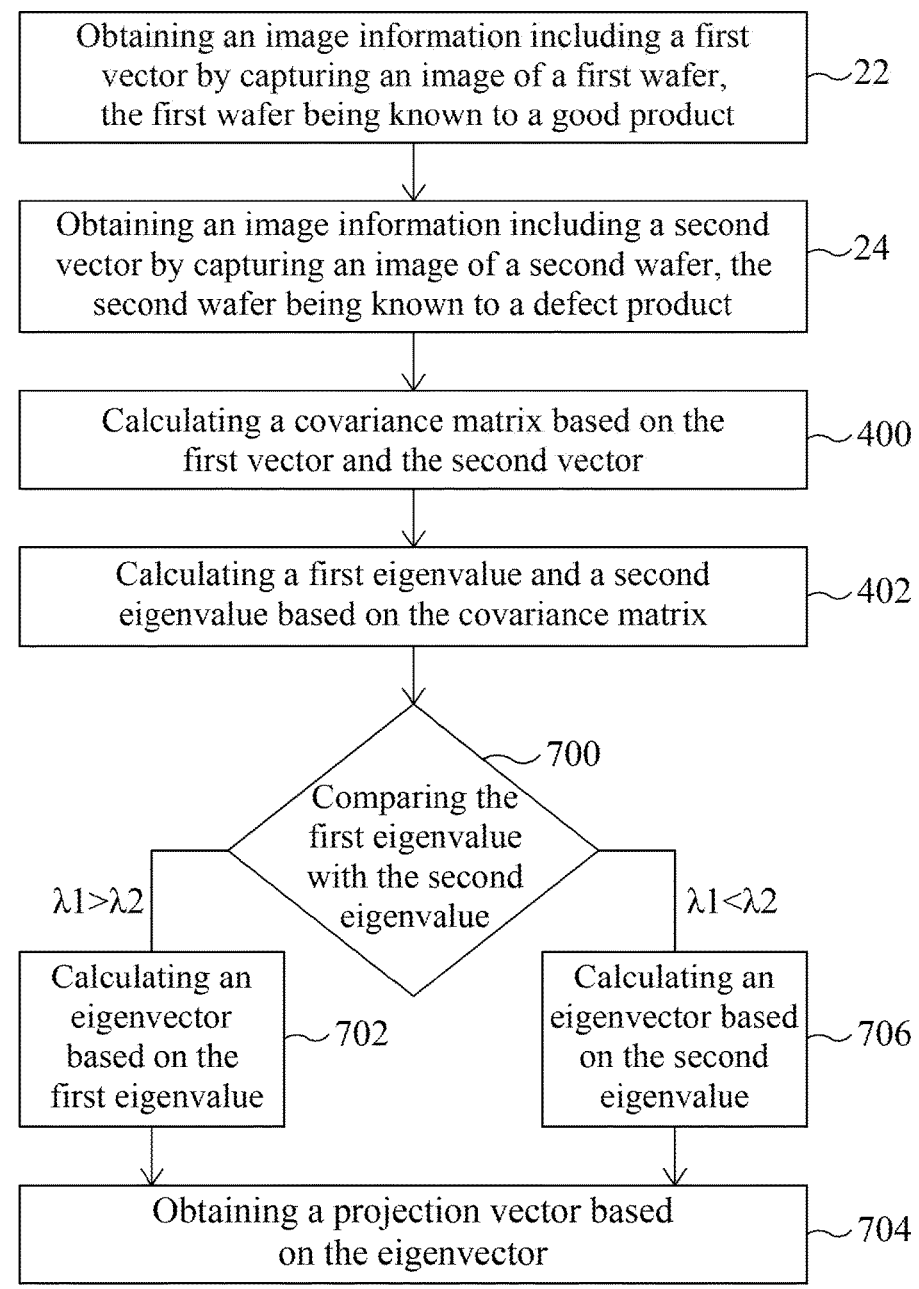
FIG. 7 is a flow chart illustrating yet another first operation of a method of recognizing wafers in accordance with some embodiments of the present disclosure.

FIG. 7 is a flow chart illustrating yet another first operation 70 of a method of recognizing wafers in accordance with some embodiments of the present disclosure. Referring to FIG. 7, the first operation 70 is similar to the first operation 40 described and illustrated with reference to FIG. 4 except that, for example, the first operation 70 includes operations 700, 702, 704 and 706.

Subsequent to operation 402, in operation 700, the first eigenvalue $\lambda 1$ is compared with the second eigenvalue $\lambda 2$. If the first eigenvalue $\lambda 1$ is greater than the second eigenvalue $\lambda 2$, the first operation 70 proceeds to operation 702, in which a single eigenvector is calculated based on the first eigenvalue $\lambda 1$ instead of calculating two eigenvectors.

In operation 704, a projection vector PV is obtained based on the eigenvector associated with the first eigenvalue $\lambda 1$. For example, in this case, the projection vector PV can be expressed as follows.

$$PV = \begin{bmatrix} m11 \\ m12 \end{bmatrix} = \begin{bmatrix} 1 \\ 2 \end{bmatrix}$$

Referring back to operation 700, if the first eigenvalue $\lambda 1$ is less than the second eigenvalue $\lambda 2$, the first operation 70 proceeds to operation 706, in which a single eigenvector is calculated based on the second eigenvalue $\lambda 2$ instead of calculating two eigenvectors. In this case, a projection vector PV can be expressed as follows.

$$PV = \begin{bmatrix} m21 \\ m22 \end{bmatrix} = \begin{bmatrix} -2 \\ 1 \end{bmatrix}$$

In the present disclosure, the processing device 14 recognizes the wafer under a test using a specific algorithm mentioned above to analyze the captured image. Therefore, a recognition rate of defective wafers is relatively high.

In contrast, in some existing wafer-identifying apparatuses, such apparatus recognizes wafers based on optical approaches. For example, a light source is provided. A light source radiates light on a wafer under a test. Subsequently, the existing apparatus determines whether the wafer has a defect based on the light reflected from the wafer. Such approach is relatively inaccurate. Moreover, in some existing approaches, a wafer under a test is identified manually.

Figure 8:
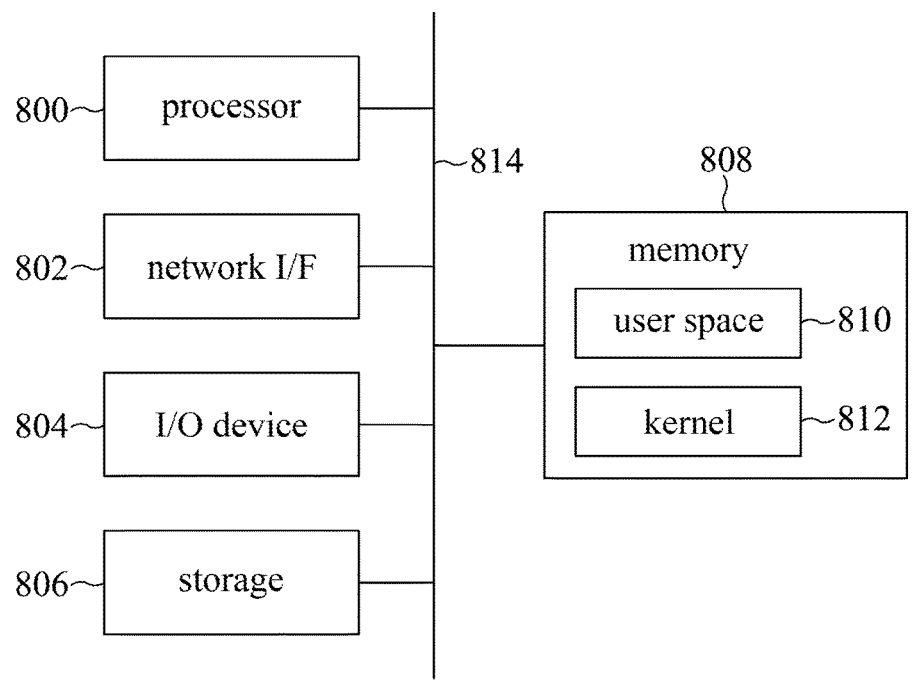
FIG. 8 is a block diagram of the processing device of FIG. 1 in accordance with some embodiments of the present disclosure.

FIG. 8 is a block diagram of the processing device 14 of FIG. 1 in accordance with some embodiments of the present disclosure. One or more of the tools, systems, or operations described with respect to FIGS. 2 to 7 are realized in some embodiments by one or more computer systems 6 of FIG. 6. The processing device 14 comprises a processor 800, a memory 808, a network interface (I/F) 802, a storage 806, and an input/output (I/O) device 804 communicatively coupled via a bus 814 or other interconnection communication mechanism.

The memory 808 comprises, in some embodiments, a random access memory (RAM), other dynamic storage device, read-only memory (ROM), or other static storage device, coupled to the bus 814 for storing data or instructions to be executed by the processor 800, e.g., kernel 812, user space 810, portions of the kernel or the user space, and components thereof. The memory 808 is also used, in some embodiments, for storing temporary variables or other intermediate information during execution of instructions to be executed by the processor 800.

In some embodiments, a storage device 606, such as a magnetic disk or optical disk, is coupled to the bus 814 for storing data or instructions, e.g., kernel 812, user space 810, etc. The I/O device 804 comprises an input device, an output device, or a combined input/output device for enabling user interaction with the system 6. An input device comprises, for example, a keyboard, keypad, mouse, trackball, trackpad, or cursor direction keys for communicating information and commands to the processor 800. An output device comprises, for example, a display, a printer, a voice synthesizer, etc. for communicating information to a user.

In some embodiments, one or more operations or functionality of the tools or systems described with respect to FIGS. 2 to 7 are realized by the processor 800, which is programmed for performing such operations and functionality. One or more of the memory 808, the I/F 802, the storage 806, the I/O device 804, the hardware components 718, and the bus 814 are operable to receive instructions, data, design rules, netlists, layouts, models and other parameters for processing by the processor 800.

In some embodiments, one or more of the operations, functionality of the tools, and systems described with respect to FIGS. 2 to 7 are implemented by specifically configured hardware (e.g., by one or more application specific integrated circuits (ASICs) which are included) separate from or in lieu of the processor 800. Some embodiments incorporate more than one of the described operations or functionality in a single ASIC.

In some embodiments, the operations and functionality are realized as functions of a program stored in a non-transitory computer readable recording medium. Examples of a non-transitory computer readable recording medium include, but are not limited to, external/removable or internal/built-in storage or memory unit, e.g., one or more of an optical disk, such as a DVD, a magnetic disk, such as a hard disk, a semiconductor memory, such as a ROM, a RAM, a memory card, and the like.

In the present disclosure, the processing device 14 recognizes the wafer under a test using a specific algorithm mentioned above to analyze the captured image. Therefore, a recognition rate of defective wafers is relatively high.

In contrast, in some existing wafer-identifying apparatuses, such apparatus recognizes wafers based on optical approaches. For example, a light source is provided. A light source radiates light on a wafer under a test. Subsequently, the existing apparatus determines whether the wafer has a defect based on the light reflected from the wafer. Such approach is relatively inaccurate. Moreover, in some existing approaches, a wafer under a test is identified manually.

One aspect of the present disclosure provides a method. The method includes obtaining image information including a first vector by capturing an image of a first wafer, wherein the first wafer is known to be a good product; obtaining image information including a second vector by capturing an image of a second wafer, wherein the second wafer is known to be a defective product; calculating a projection vector based on a covariance matrix associated with the first vector and the second vector; obtaining image information including a third vector by capturing an image of a third wafer under a test; projecting each of the first vector, the second vector and the third vector onto the projection vector; and classifying the third wafer as either the good product or the defective product based on the projected first vector, the projected second vector and the projected third vector.

Another aspect of the present disclosure provides a method. The method includes obtaining image information including a first vector by capturing an image of a first wafer, wherein the first wafer is known to be a good product; obtaining image information including a second vector by capturing an image of a second wafer, wherein the second wafer is known to be a defective product; calculating a covariance matrix based on the first vector and the second vector; calculating a first eigenvalue and a second eigenvalue based on the covariance matrix; comparing the first eigenvalue and the second eigenvalue; calculating an eigenvector based on the first eigenvalue, instead of on both the first and second eigenvalues, when the first eigenvalue is greater than the second eigenvalue; obtaining a projection vector based on the eigenvector; projecting each of the first vector, the second vector and the third vector onto the projection vector; and classifying the third wafer as either the good product or the defective product based on the projected first vector, the projected second vector and the projected third vector.

Another aspect of the present disclosure provides an apparatus. The apparatus includes an image capturing device and a processing device. The image capturing device is configured to capture an image of a first wafer, an image of a second wafer and an image of a third wafer, wherein the first wafer is known to be a good product, the second wafer is known to be a defective product, and the third wafer is under a test. The processing device is configured to obtain image information including a first vector based on the image of the first wafer, obtain image information including a second vector based on the image of the second wafer, obtain image information including a third vector based on the image of the third wafer, calculate a projection vector based on a covariance matrix associated with the first vector and the second vector, project each of the first vector, the second vector and the third vector onto the projection vector, and classify the third wafer as either the good product or the defective product based on the projected first vector, the projected second vector and the projected third vector.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
    obtaining image information including a first vector and a second vector by respectively capturing an image of a first wafer and an image of a second, wherein the first wafer is known to be a good product, wherein the second wafer is known to be a defective product;
    calculating a projection vector based on a covariance matrix associated with the first vector and the second vector;
    obtaining image information including a third vector by capturing an image of a third wafer under a test;
    projecting each of the first vector, the second vector and the third vector onto the projection vector; and
    classifying the third wafer as either the good product or the defective product based on the projected first vector, the projected second vector and the projected third vector.

2. The method of claim 1, wherein the calculation of the projection vector based on the covariance matrix associated with the first vector and the second vector further comprises:
    calculating the covariance matrix based on the first vector and the second vector.

3. The method of claim 2, wherein the calculation of the projection vector based on the covariance matrix associated with the first vector and the second vector further comprises:
    calculating a first eigenvalue and a second eigenvalue based on the covariance matrix.

4. The method of claim 3, wherein the calculation of the projection vector based on the covariance matrix associated with the first vector and the second vector further comprises:
    calculating a first eigenvector and a second eigenvector based on both the first eigenvalue and the second eigenvalue.

5. The method of claim 4, wherein the calculation of the projection vector based on the covariance matrix associated with the first vector and the second vector further comprises:
    calculating the projection vector based on both the first eigenvector and the second eigenvector.

6. The method of claim 1, wherein the classification of the third wafer as either the good product or the defective product based on the projected first vector, the projected second vector and the projected third vector comprises:
    classifying the third wafer as either the good product or the defective product based on the projected first vector, the projected second vector and the projected third vector and according to the nearest neighbor rule (NNR).

7. The method of claim 1, wherein the classification of the third wafer as either the good product or the defective product based on the projected first vector, the projected second vector and the projected third vector comprises:
    calculating a first distance between the projected first vector and the projected third vector;
    calculating a second distance between the projected first vector and the projected third vector; and
    classifying the third wafer as either the good product or the defective product based on the first distance and the second distance.

8. The method of claim 7, wherein the classification of the third wafer as either the good product or the defective product based on the first distance and the second distance comprises:
    classifying the third wafer as the good product when the first difference is less than the second difference.

9. The method of claim 7, wherein the classification of the third wafer as either the good product or the defective product based on the first distance and the second distance comprises:
    classifying the third wafer as the defective product when the first difference is greater than the second difference.

10. A method, comprising:
    obtaining image information including a first vector by capturing an image of a first wafer, wherein the first wafer is known to be a good product;
    obtaining image information including a second vector by capturing an image of a second wafer, wherein the second wafer is known to be a defect product;
    calculating a covariance matrix based on the first vector and the second vector;
    calculating a first eigenvalue and a second eigenvalue based on the covariance matrix;
    comparing the first eigenvalue and the second eigenvalue;
    calculating an eigenvector based on the first eigenvalue, instead of on both the first eigenvalue and the second eigenvalue when the first eigenvalue is greater than the second eigenvalue;
    obtaining a projection vector based on the eigenvector;
    projecting each of the first vector, the second vector and the third vector onto the projection vector; and
    classifying the third wafer as either the good product or the defective product based on the projected first vector, the projected second vector and the projected third vector.

11. The apparatus of claim 10, wherein the classification of the third wafer as either the good product or the defective product based on the projected first vector, the projected second vector and the projected third vector comprises:
    classifying the third wafer as either the good product or the defective product based on the projected first vector, the projected second vector and the projected third vector and according to the nearest neighbor rule (NNR).

12. The apparatus of claim 10, wherein the classification of the third wafer as either the good product or the defective product based on the projected first vector, the projected second vector and the projected third vector comprises:
    calculating a first distance between the projected first vector and the projected third vector;

calculating a second distance between the projected first vector and the projected third vector; and classifying the third wafer as either the good product or the defective product based on the first distance and the second distance.

13. The apparatus of claim 12, wherein the classification of the third wafer as either the good product or the defective product based on the first distance and the second distance comprises:

classifying the third wafer as the good product when the first difference is less than the second difference.

14. The apparatus of claim 12, wherein the classification of the third wafer as either the good product or the defective product based on the first distance and the second distance comprises:

classifying the third wafer as the defective product when the first difference is greater than the second difference.

15. An apparatus, comprising:

an image capturing device configured to capture an image of a first wafer, an image of a second wafer and an image of a third wafer, wherein the first wafer is known to be a good product, the second wafer is known to be a defective product, and the third wafer is under a test; and a processing device configured to:

obtain image information including a first vector and a second vector respectively based on the image of the first wafer and the image of the second wafer;

obtain image information including a third vector based on the image of the third wafer;

calculate a projection vector based on a covariance matrix associated with the first vector and the second vector;

project each of the first vector, the second vector and the third vector onto the projection vector; and classify the third wafer as either the good product or the defective product based on the projected first vector, the projected second vector and the projected third vector.

16. The apparatus of claim 15, wherein the processing device is further configured to calculate the covariance matrix based on the first vector and the second vector.

17. The apparatus of claim 16, wherein the processing device is further configured to calculate a first eigenvalue and a second eigenvalue based on the covariance matrix.

18. The apparatus of claim 17, wherein the processing device is further configured to calculate a first eigenvector and a second eigenvector based on both the first eigenvalue and the second eigenvalue.

19. The apparatus of claim 18, wherein the processing device is further configured to calculate the projection vector based on both the first eigenvector and the second eigenvector.

* * * * *